United States Patent [19]

Smith

[11] Patent Number: 5,129,504
[45] Date of Patent: Jul. 14, 1992

[54] SINGLE FILE CONVEYOR SYSTEM

[75] Inventor: Paul W. Smith, Forest, Va.

[73] Assignee: Simplimatic Engineering Company, Lynchburg, Va.

[21] Appl. No.: 764,780

[22] Filed: Sep. 24, 1991

Related U.S. Application Data

[63] Continuation-in-part of Ser. No. 683,266, Apr. 10, 1991.

[51] Int. Cl.⁵ ............................................. B65G 47/12
[52] U.S. Cl. ................................... 198/453; 198/454; 198/455
[58] Field of Search ................ 198/452, 453, 454, 455

[56] References Cited

U.S. PATENT DOCUMENTS

| | | | |
|---|---|---|---|
| 2,047,106 | 7/1936 | Lidberg et al. | 198/455 |
| 2,560,995 | 7/1951 | Stiles | 198/455 |
| 2,656,910 | 10/1953 | Kraus et al. | |
| 3,162,291 | 12/1964 | Bell | 198/455 |
| 3,310,151 | 3/1967 | Carter | 198/453 X |
| 3,592,324 | 7/1971 | Caunt | |
| 3,601,240 | 8/1971 | Dominici | |
| 3,610,396 | 10/1971 | Babunovic | |
| 3,707,216 | 12/1972 | Peres | 198/455 |
| 4,146,467 | 3/1979 | Sauer et al. | |
| 4,236,625 | 12/1980 | Smith et al. | 198/454 |
| 4,252,232 | 2/1981 | Beck et al. | |
| 4,253,783 | 3/1981 | Lenhart | |
| 4,560,060 | 12/1985 | Lenhart | |
| 4,567,978 | 2/1986 | Hartness | 198/454 |
| 4,623,059 | 11/1986 | Agnew | 198/453 X |
| 4,669,604 | 6/1987 | Lenhart | |
| 4,768,643 | 9/1988 | Lenhart | |
| 4,889,224 | 12/1989 | Denker | |

Primary Examiner—D. Glenn Dayoan
Attorney, Agent, or Firm—St. Onge Steward Johnston & Reens

[57] ABSTRACT

A conveyor is provided for producing a single file from a mass of articles comprising a conveyor surface, an article engager for engaging articles in the mass and transporting a single file of them off of the conveyor surface, and a guide rail mounted along the conveyor surface, the guide rail including a shifting portion for creating an accumulation of articles, a gap filling portion for filling gaps in the single file of articles, and a pressure relieving portion for relieving some of a back pressure on articles. The conveyor preferably also includes a fourth guide rail portion for spacing the first portion upstream from the third portion, or an oscillator for jostling articles, or a roller for rotating articles.

23 Claims, 8 Drawing Sheets

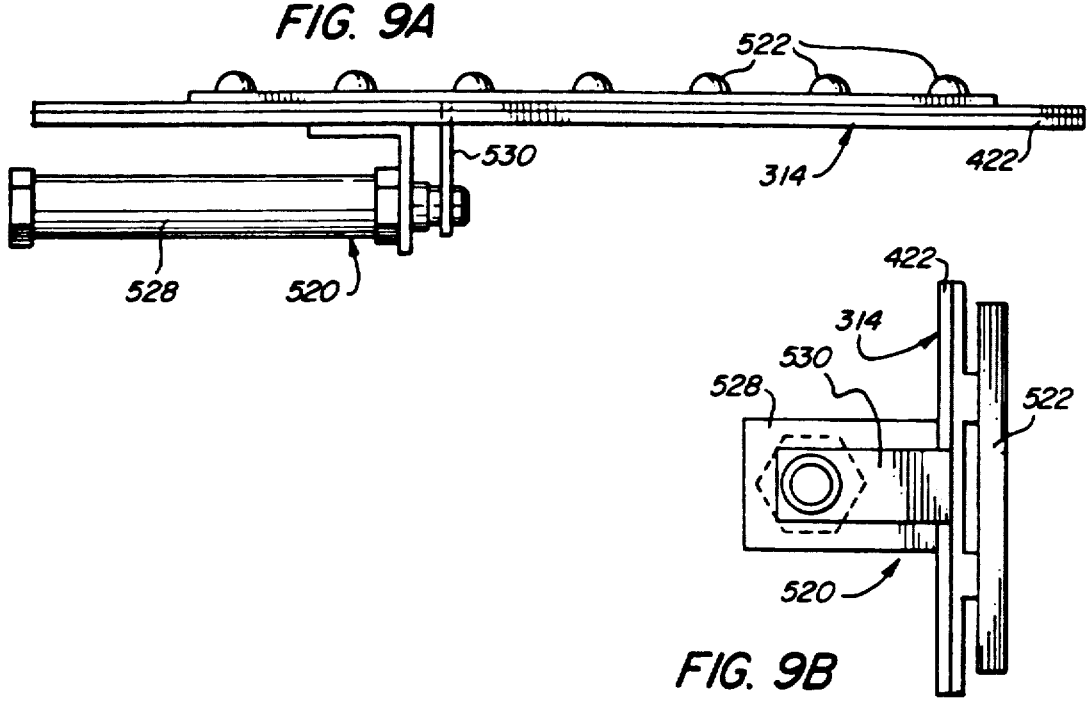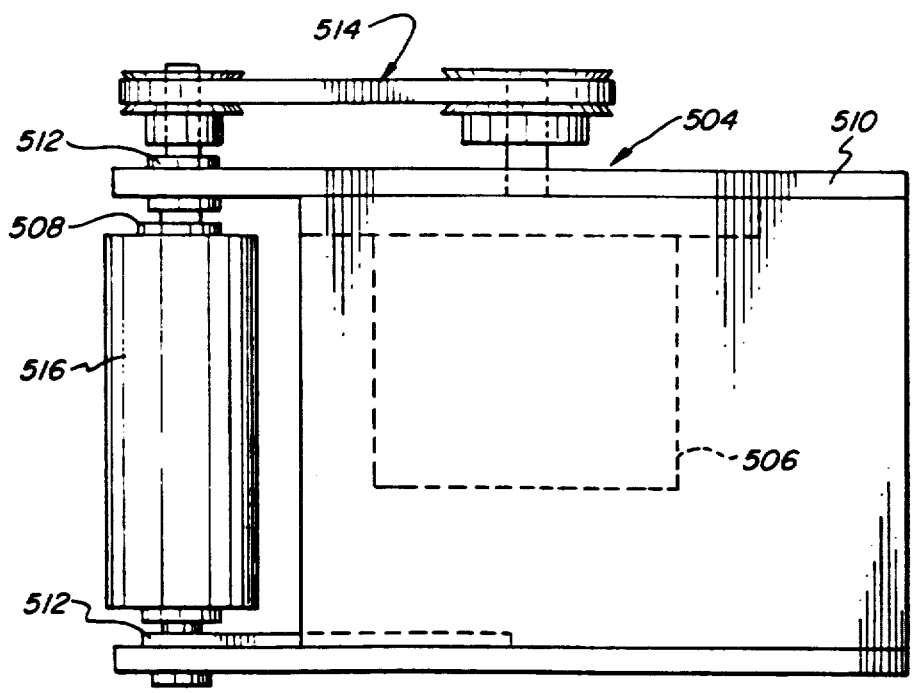

SINGLE FILE CONVEYOR SYSTEM

This is a continuation-in-part of copending application Ser. No. 07/683,266 filed on Apr. 10, 1991.

TECHNICAL FIELD

This invention generally relates to conveyors, and more specifically to apparatuses and methods for providing a single file from a mass of articles.

BACKGROUND ART

Single file conveyor systems are well known in the conveyor art. Some such systems form a single file from an incoming mass of articles, while others properly orient and align articles for downstream operations, and still others present articles at predetermined spaced intervals. By way of example, the following single file conveyor systems provide a variety of features for accomplishing a variety of single file functions.

U.S. Pat. No. 4,560,060 discloses a relatively simple converging sidewall design. Upstream of the converging sidewalls is a transfer mechanism including a porous foraminous belt for eliminating downed or misformed cans from the convergence.

U.S. Pat. No. 4,768,643 and its parent, U.S. Pat. No. 4,669,604, disclose a single diagonal deflector which creates a single file from an equilateral transverse row of articles. A deadplate having a diagonal leading edge holds the articles in the equilateral contiguous triangular configuration.

U.S. Pat. No. 3,610,396 includes oblique guides converging across a supply conveyor toward a single file delivery conveyor. The guides each include counterweighted yieldable bars which impart a kneading action to the articles upon convergence. A belt imparts spin to the articles to further prevent bridging.

U.S Pat. No. 4,252,232 discloses a conveyor system having a vacuum belt for providing a single file from a recirculating mass of articles. The cans recirculate around between adjacent conveyors.

U.S. Pat. No. 4,253,783 discloses a waterfall single filer for articles with horizontal axes. The articles fall from an upper ramp into a stacked pyramid upon a lower ramp, and move over an action lip, down a cascade ramp and into a flow-out forming an ogee curve type of weir structure.

U.S. Pat. No. 2,656,910 discloses can deflector belts for moving articles from a main conveyor belt to auxiliary conveyor belts.

U.S. Pat. No. 3,592,324 discloses a device for arranging articles having major and minor dimensions into a single file. Article-feeding conveyors operate at different speeds to separate individual articles' engagement upon a guide.

U.S. Pat. No. 3,601,240 discloses a barrier belt for permitting row-wise advancement of articles toward downstream conveyors and movable guides for alignment and orientation.

U.S. Pat. No. 4,889,224 discloses a device for aligning products comprising a plurality of belts in various alignment for intercepting and rotating misaligned products.

SUMMARY OF THE INVENTION

It is an object of this invention to provide a conveyor system for producing a single file from a mass of articles. It is another object of the invention to provide a conveyor system for reducing the incidence of jams during single filing. It is a further object of the invention to provide a guide rail contoured to provide a single file from a mass of articles. It is still another object of the invention to provide a conveyor system for transporting a single file of articles to a flange guide conveyor. It is a still further object of the invention to provide a conveyor system for producing a single file from a mass of PET bottles.

These and other objects are achieved by provision of a conveyor comprising a conveyor surface; an article engager for engaging articles in the mass and transporting a single file of them off of the conveyor surface, the article engager mounted at an angle to the conveyor; and a guide rail mounted along the conveyor surface, the guide rail including a shifting portion for shifting articles across the conveyor surface to create an accumulation, and a pressure relieving portion for relieving some of a back pressure on articles, and a gap-filling portion to fill gaps in the single file of articles.

In one embodiment the gap-filling portion includes a rotator. In another embodiment the pressure relieving portion includes an oscillating agitator. In another embodiment the guide rail additionally includes a portion extending substantially parallel to the conveyor path. In other aspects, the invention relates to methods for producing a single file of articles in conjunction with each of the above embodiments.

The invention and its particular features will become more apparent from the following detailed description when considered with reference to the accompanying drawings.

BRIEF DESCRIPTION OF THE DRAWINGS

FIG. 8 is an enlarged side elevation view of the roller of the conveyor of FIG. 6.

FIG. 9A and 9B are enlarged top and end views of the oscillator of the conveyor of FIG. 6.

DETAILED DESCRIPTION OF THE INVENTION

Figure 1:
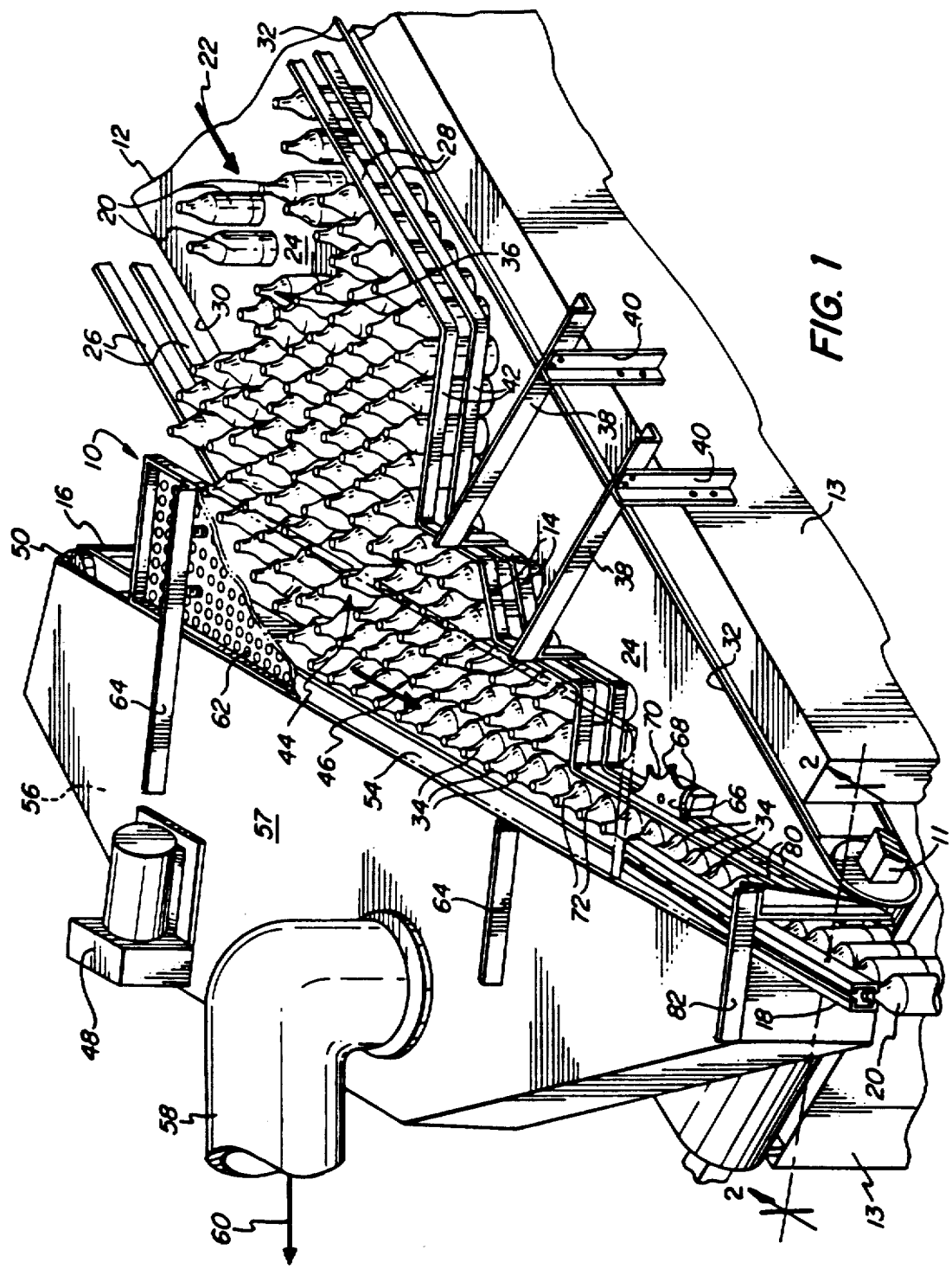
FIG. 1 is an isometric view of one embodiment of a conveyor in accordance with the invention.
Figure 6:
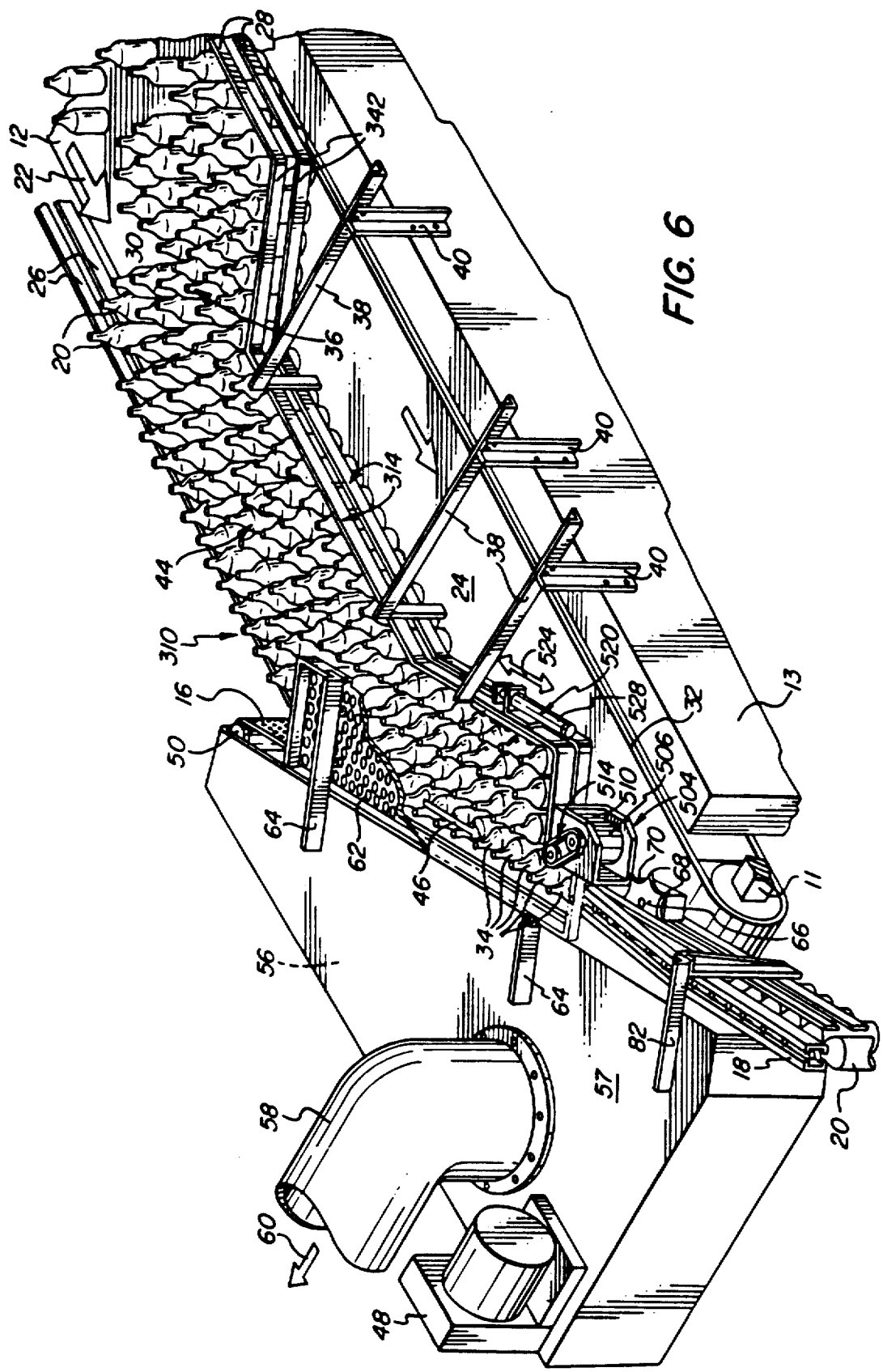
FIG. 6 is an isometric view of another embodiment of a conveyor in accordance with the invention.

Single file conveyor systems 10, 310 in accordance with this invention, are generally shown in isometric views in FIGS. 1 and 6. Conveyor systems 10, 310 are supported by a frame 13 and circulate about an axle and roller 11 which is also supported by frame 13. Axle and roller 11 is energized by a motor (not shown in any Figure). Conveyor systems 10, 310 comprise a conveyor 12, a contoured guide rail 14, 314 and means such as a vacuum take-off belt 16 for engaging and transporting articles in a single file. Conveyor systems 10, 310 may also include a flange or neck guide conveyor 18 for receiving a single file of articles from vacuum take-off belt 16 and transporting them further downstream.

Conveyor 12 conveys articles 20 along a conveyor path indicated by arrow 22 from a location further upstream which may, for example, include a machine for unloading articles 20 such as a palletizer/depalletizer, a machine for making articles 20, or the like. The type of conveyor 12 utilized is not critical, and will likely depend upon the type of articles 20 to be single filed, as well as the overall conveyor system environment. For articles such as PET bottles, conveyor 12 is preferably provided as an endless belt conveyor since the irregular bottoms of some PET bottles may render air conveyors rather ineffective. However, air conveyors may be used for articles such as cans which generally have more regularly shaped bottoms, and for other articles not likely to be tipped by jets of an air conveyor. In any event, conveyor 12 provides articles 20 along conveyor path 22 upon a conveyor surface 24 in a downstream direction. Guide rails 26 and 28 located at respective edges 30 and 32 of conveyor 12 help retain articles 20 upon conveyor surface 24 as they move downstream.

Contoured guide rails 14, 314 comprise a number of guide rail portions each having an individual function in the preparation of a single file 34 of articles 20 from a mass 36 of articles delivered along conveyor path 22. Guide rails 14, 314 are mounted above conveyor surface 24 by brackets 38 so as to permit conveyor 12 to convey articles 20 into contact with guide rails 14, 314. Brackets 38 are fastened to uprights 40 in turn mounted to conveyor frame 13 which supports conveyor systems 10, 310.

Portions 42, 242 of contoured guide rails 14, 314 extend across conveyor surface 24 at an angle to conveyor pathway 22 and serve to shift or direct articles 20 from near edge 32 of conveyor 12 in a direction substantially across the conveyor toward edge 30 or vacuum take-off belt 16. Guide rail portions 42, 342 are aligned to converge with conveyor pathway 22 at an angle of preferably between about 30° and 60°. Guide rail portion 42 most preferably converges at an angle of about 45°. Guide rail portion 342 most preferably converges at an angle of about 45°. However, almost any angle greater than 0° and less than 90° is possible depending upon the density and speed of mass 36 of articles conveyed along conveyor path 22 by conveyor 12. This shifting or directing of articles in a direction substantially across conveyor 12 is intended to produce an accumulation 44 of articles in the vicinity and downstream of guide rail portion 42, 342. In this regard, generally the higher the density and speed of the mass of articles conveyed on conveyor 12, the shallower the alignment angle of guide rail portion 42, 342 in order to provide such an accumulation 44 of articles. The functions of other portions of contoured guide rails 14, 314 will be discussed below with reference to FIGS. 3 to 5 for system 10, and with reference to FIG. 7 for system 310.

Vacuum take-off belt 16 engages articles 20 from mass 36 of articles and transports them in single file 34 along a single file path indicated by arrow 46. Motor 48 circulates endless take-off belt 16 around axled rollers 50 (also see FIGS. 3 to 5 and 7). As shown, endless vacuum take-off belt 16 is preferably substantially vertically arranged and aligned in a direction substantially across conveyor 12 at an angle converging with conveyor pathway 22 preferably from between about 20° and 40° and, most preferably, about 30°. Further, endless vacuum take-off belt 16 is arranged most preferably on an opposite side of conveyor 12 from guide rail portion 42, 342. Belt 16 preferably meets edge 30 of conveyor 12 approximately near an end 51 (see FIGS. 3 to 5 and 7) of guide rail 26.

Figure 2:
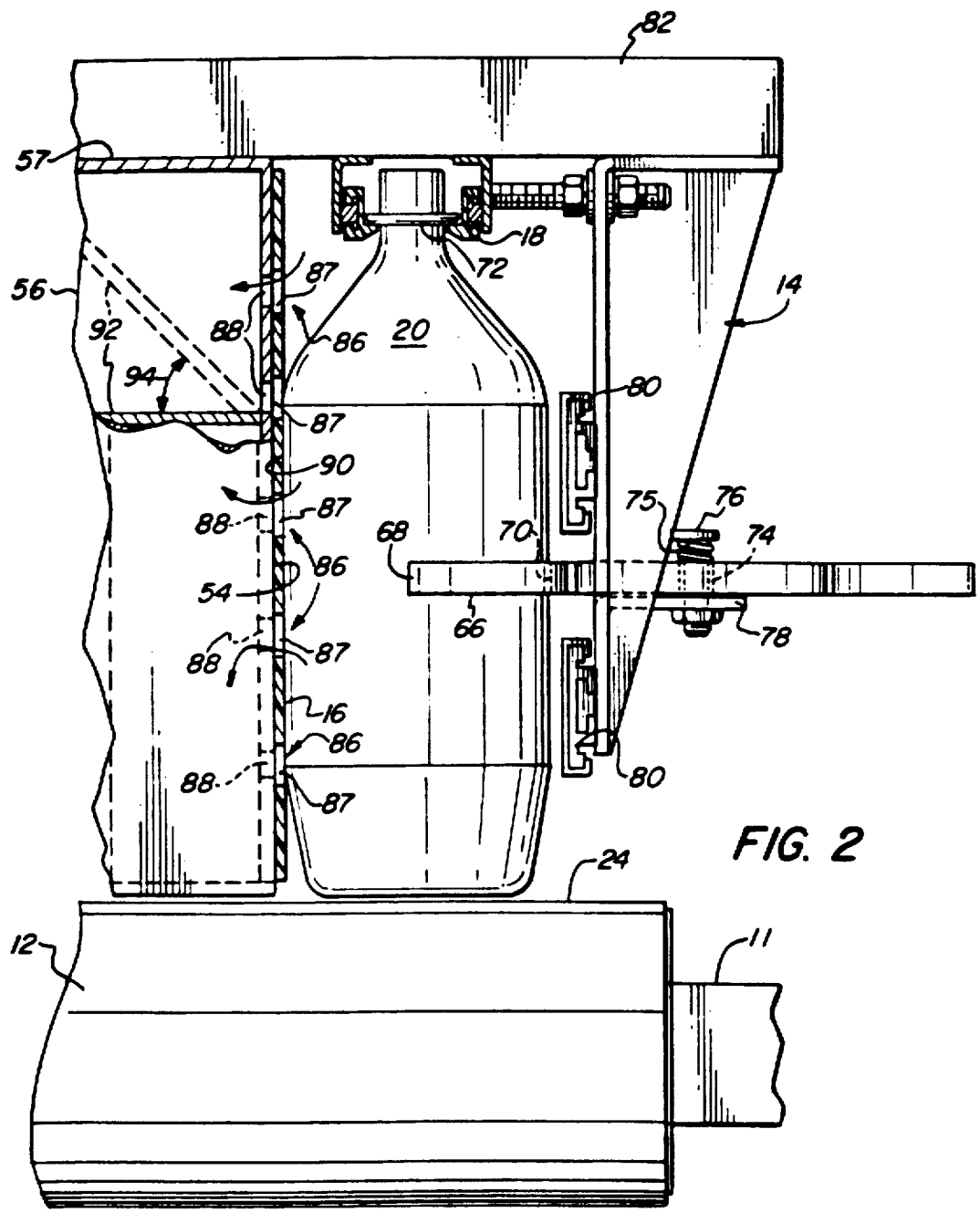
FIG. 2 is a cross section taken along the axis 2—2 of FIG. 1 depicting additional detail of the flange guide conveyor and the vacuum take-off belt of the conveyor of FIG. 1.

Endless vacuum take-off belt 16 slides along a perforated substantially vertical side surface 54 of a vacuum chamber 56 (also see FIG. 2). A vacuum pump (not shown in any Figure) connected to vacuum hose 58 creates a vacuum pressure within vacuum chamber 56 as indicated by arrow 60. Vacuum pressure 60 may range as high as five to eight or more inches of water. The operation of vacuum chamber 56 to engage or attract articles into a single file upon belt 16 is discussed below especially in conjunction with FIG. 2. A hold down plate 62, connected to a top surface 57 of vacuum chamber 56 by brackets 64, aids in the orderly single filing of articles 20 by preventing them from being propelled off conveyor surface 24. Brackets 64 may be provided with an air cylinder or like means (not shown) for raising hold down plate 62 to facilitate clearing a jam.

Where articles 20 are PET bottles or the like, single file 34 is preferably passed through a straightening wheel 66 and onto flange guide conveyor 18. Straightening wheel 66 includes spokes 68, successive ones of which form pockets 70 which are preferably shaped to match a cross section of articles 20. Thus, as articles 20 pass by straightening wheel 66, the article 20 is vertically straightened by aligning its cross section with pocket 70. Vertically straightened articles 20 of single file 34 are more easily passed to flange guide conveyor 18. Again in the case of PET bottles, flange guide conveyor 18 is preferably a neck guide conveyor which supports bottles beneath a neck flange 72.

In the case of articles 20 other than PET bottles, flange guide conveyor 18 leading to downstream operations may be replaced with any of a number of different conveyor types, and no means for vertically straightening articles may be necessary.

Referring now to FIG. 2, a cross section taken along axis 2—2 of FIGS. 1 and 6, the arrangement of straightening wheel 66, neck guide conveyor 18, endless vacuum take-off belt 16 and conveyor 12 is depicted. Straightening wheel 66, including central bore 74, is mounted with a spring 75 and a nut and bolt combination 76 such that straightening wheel 66 is free to rotate. Spring 75 prevents free-wheeling of straightening wheel 66 and retains wheel 66 in position for receipt of a next article. Nut and bolt combination 76 is fastened to a platform 78 extending from a single file portion 80 of contoured guide rail 14. An overhead bracket 82 secures a single file portion 80 of guide rail 14 and flange guide conveyor 18 to top surface 57 of vacuum chamber 56 by, for example, welding or like means.

Vacuum take-off belt 16 preferably includes a plurality of rows 86 of perforations 87 which are aligned with perforations 88 in substantially vertical perforated surface 54 of vacuum chamber 56. Belt 16 could also be made without perforations from a sufficiently air permeable material. Perforations 88 in surface 54 of vacuum chamber 56 preferably comprise slots running substantially the entire length of surface 54 over which articles 20 are transported; whereas, rows 86 of endless vacuum take-off belt 16 preferably comprise individual perforations 87 and extend substantially completely the length of belt 16. Perforations 87 are preferably in the range of about ⅛ inch to ⅜ inches in diameter. Most preferably, perforations 87 are located along rows 86 at longitudinally spaced intervals of less than an article diameter. In this way, belt 16 preferably may accept articles 20 at virtually any position therealong.

Vacuum pressure 60 acts as indicated by the arrows through perforations 87 and 88 to draw side surface 90 of articles 20 toward vacuum take-off belt 16 in order to separate a single file 34 of articles 20 from mass 36. Vacuum chamber 56 preferably includes a damper 92 movable as generally indicated by arrow 94 by a lever or the like (not shown in any Figure) to prevent vacuum pressure 60 from directly acting upon slots 88 in perforated surface 54 which are not necessary to draw a particular type of article toward belt 16. Thus, for example, a relatively shorter article such as a can or 16 oz. size PET bottle may only require that vacuum pressure 60 be applied to the three lowest slots 88 in order to effectively draw the article to vacuum take-off belt 16. As shown, however, a two-liter size PET bottle may require a vacuum pressure through all five slots 88 located within surface 54 in order to effectively draw the bottle to vacuum take-off belt 16.

As alluded to above, vacuum take-off belt 16 is but one means for engaging and transporting single file 34 away from mass 36 of articles. Other means include vertical belts or bands without vacuum pressure, various horizontal conveyors including belts or bands with or without vacuums, air tables, and the like. As with the selection of conveyor 12, the selection of take-off belt 16 will likely depend upon the particular type of articles 20 to be single filed as well as the overall conveyor system environment.

Figure 3:
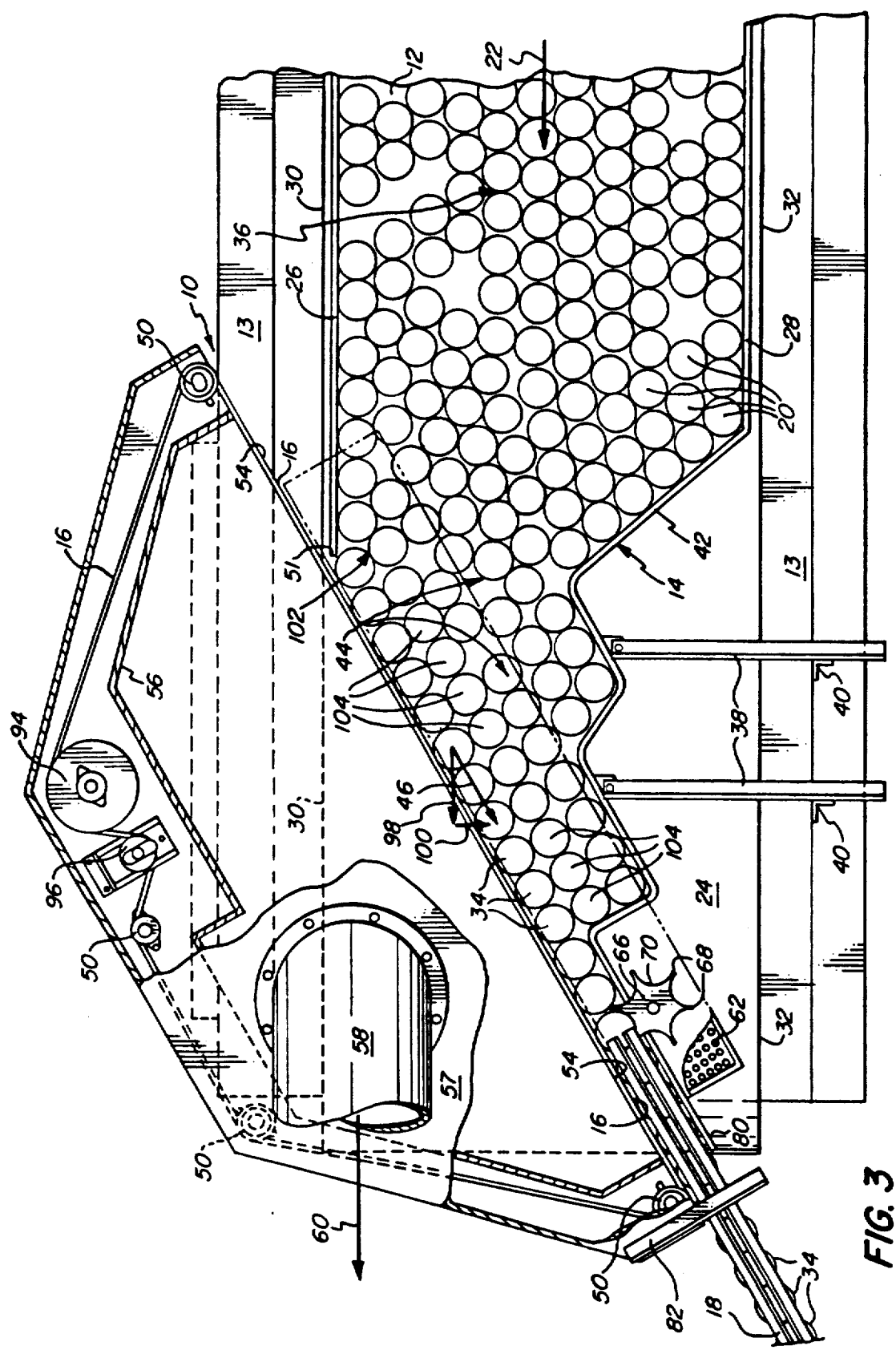
FIG. 3 is a top plan view of the conveyor of FIG. 1 revealing additional detail.
Figure 7:
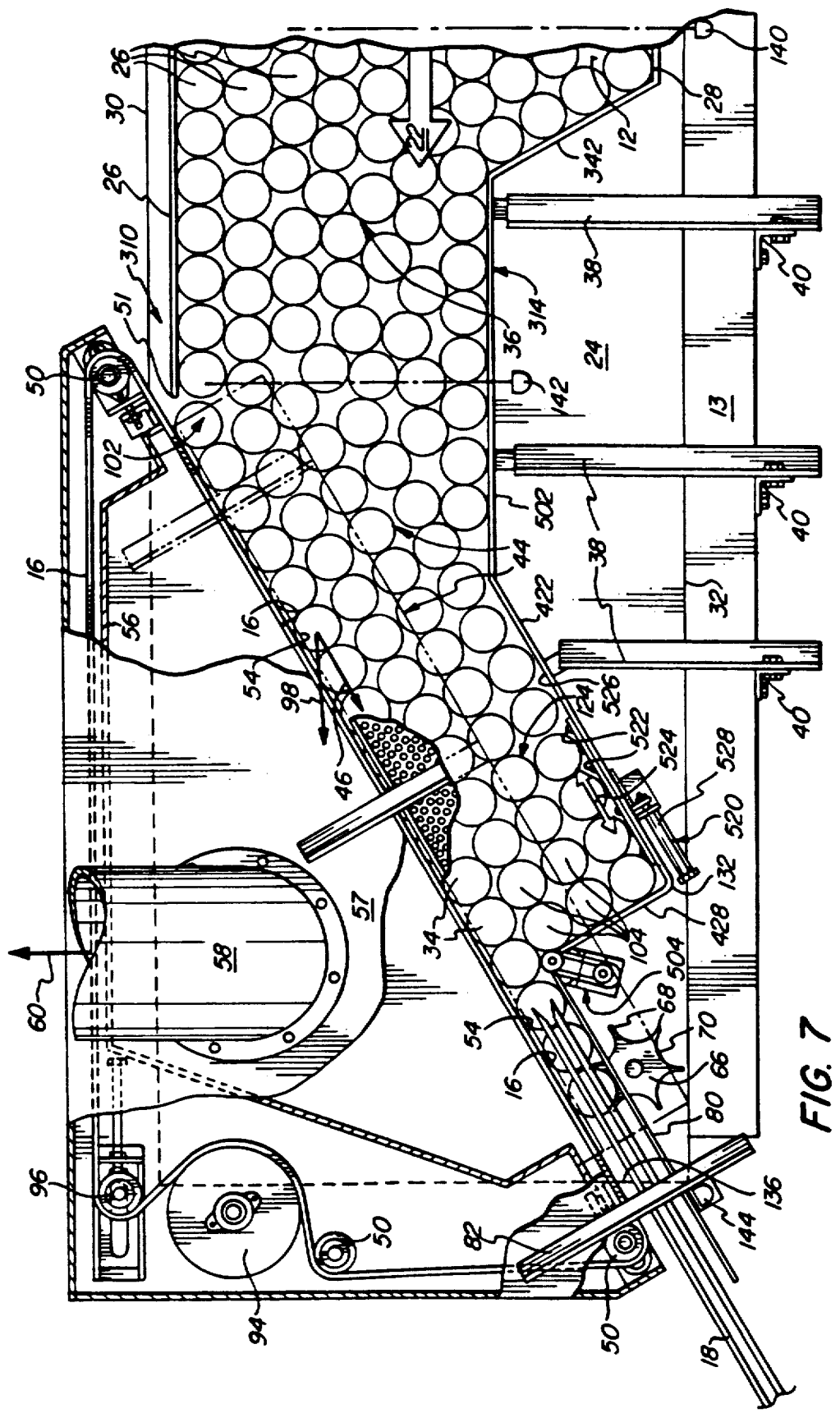
FIG. 7 is a top plan view of the conveyor of FIG. 6 revealing additional detail.

Referring now to FIGS. 3 and 7, top plan views reveal additional detail of conveyor systems 10, 310. Belt 16 advances across perforated surface 54 of vacuum chamber 56 and is circulated around axled rollers 50 by energized roller 94. Energized roller 94 is operatively coupled to motor 48 (see FIGS. 1 and 6). For smooth start-up, motor 48 may be provided with a variable frequency control. A belt tensioner 96 preferably is also provided.

The velocity of belt 16 along single file path 46 may range as high as 500 feet/minute or higher. Belt 16 velocity includes a component indicated by arrow 98 parallel to conveyor path 22 as well as a component indicated by arrow 100 perpendicular to conveyor path 22. Component 98 of belt 16 velocity is preferably greater than the velocity of conveyor 12. Most preferably, component 98 is at least about a factor of ten times greater than conveyor 12 velocity. Component 98 can be as large as a factor of thirty times greater than conveyor 12 velocity.

In operation of conveyor systems 10, 310, a majority of articles 20 forming single file 34 are drawn by vacuum pressure 60 to belt 16 from a take-off area 102 near end 51 of guide rail 26. In this regard, articles 20 near edge 30 of conveyor 12 may be conveyed relatively unimpeded along guide rail 26 substantially directly toward take-off belt 16. Once articles 20 are drawn to and engaged by belt 16 into single file 34, they are transported along single file path 46 and bump or slide along a row 104 of gap-filling articles.

Figure 4:
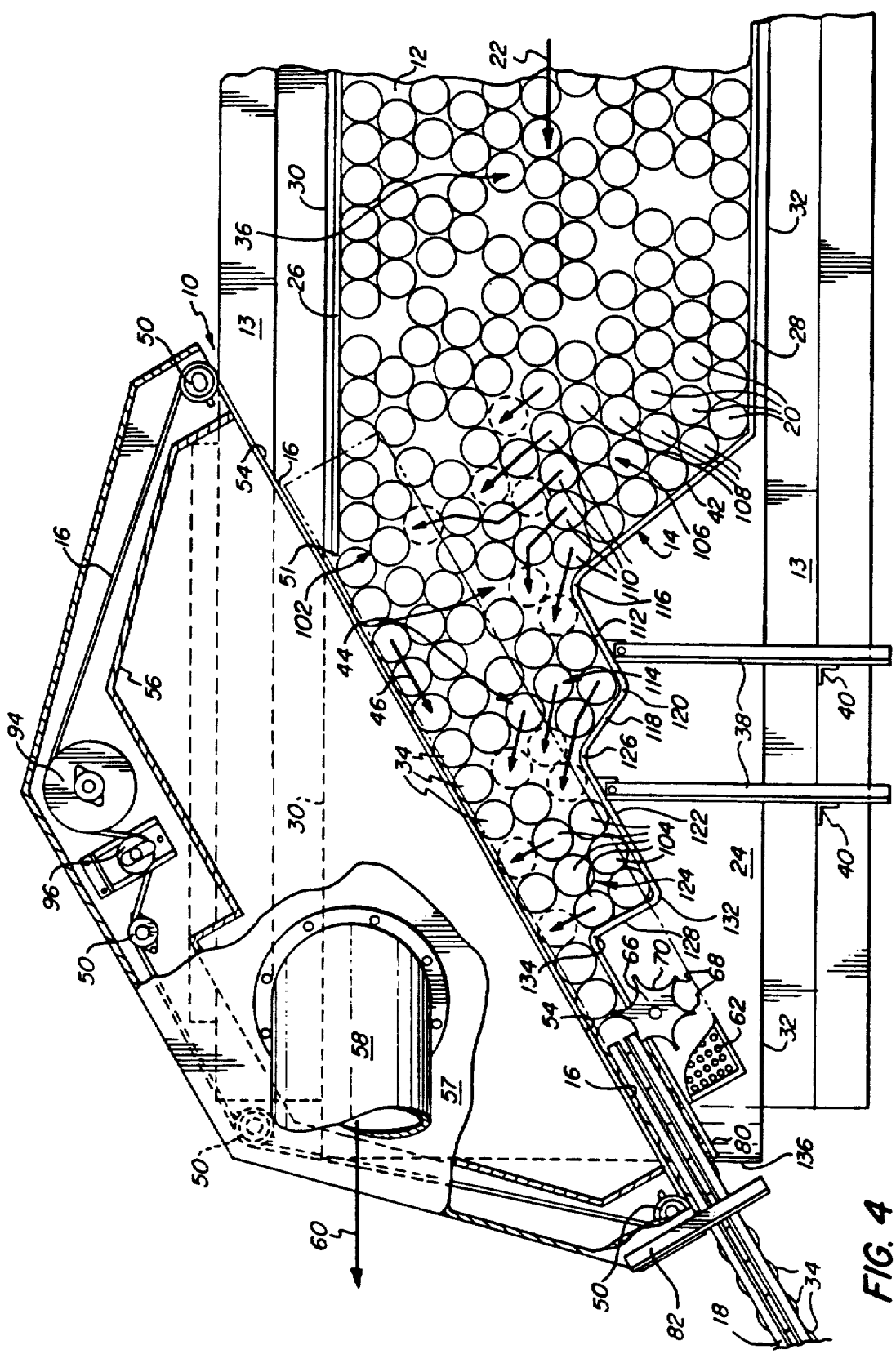
FIGS. 4, 5 are top plan views schematically depicting operation of the conveyor of FIG. 1 including the accumulation of articles, void filling in the accumulation and gap filling in the single file.
Figure 5:
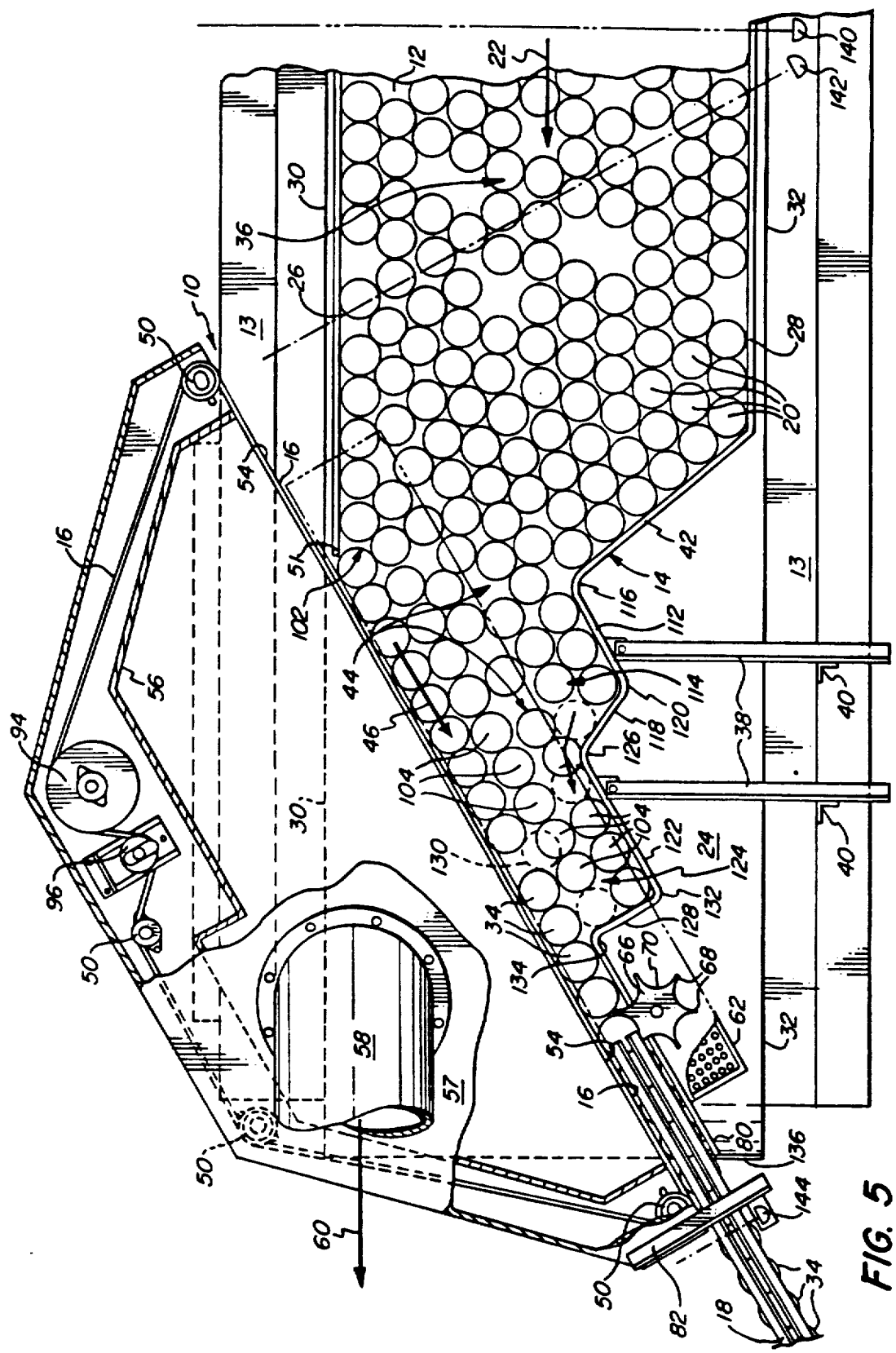

Referring now to FIGS. 4 and 7, additional details of operation are depicted including creating accumulation 44 of articles, and filling gaps in single file 34. As discussed above in conjunction with FIG. 1, portion 42, 342 of guide rail 14, 314 shifts or directs articles 20 substantially across conveyor 12 at an angle to conveyor path 22 to form accumulation 44. Accumulation 44 forms despite the removal of articles by belt 16 from mass 36 at take-off area 102. Articles 20 shifting along guide rail portion 42 may, as illustrated in FIGS. 3, 4 and 5 only, form a substantially triangular pattern 106 substantially as illustrated.

Where articles 20 do form a substantial triangular pattern 106, ones conveyed along guide rail 28 fill an upstream side 108 of triangular pattern 106. In turn, articles 20 from downstream side 110 of triangular pattern 106 accumulate in area 44. As articles 20 in accumulation 44 are consolidated to occupy regions, indicated by dashed lines, which are closest to take-off area 102, articles from downstream side 110 of triangular pattern 106 are shifted to occupy both regions vacated by those articles being consolidated, as well as additional regions indicated by dashed lines. The regions indicated by dashed lines represent open areas within accumulation 44 which are large enough to receive an article.

A portion 122, 422 of contoured guide rail 14, 314 located downstream of guide rail portion 42, 342 functions to aid in relieving a back pressure which builds up upon articles located within accumulation 44 and along guide rail portion 42, 342. "Back pressure" means the force applied by the mass 36 of relatively upstream articles being substantially continuously conveyed against relatively downstream articles. Guide rail portion 122, 422 extends across conveyor surface 24 toward edge 32, and is preferably aligned substantially parallel with single file path 46. The alignment of guide rail portion 122, 422 back toward edge 32 creates a region 124 of relatively lower back pressure preventing articles 20 in the region from being forcibly pressed together and thus permitting them to move more freely.

A portion 128, 428 of contoured guide rail 14, 314 located downstream of guide rail portion 122, 422 functions to facilitate filling gaps, indicated in dashed lines, within single file 34. Guide rail portion 128, 428 extends across conveyor surface 24 toward edge 30 at an angle substantially perpendicular to take-off belt 16. The alignment of guide rail portion 128, 428 provides at least one and preferably two or more substantially parallel rows 104 of gap-filling articles, each substantially parallel to single file 34 of articles. In this regard, the distance between take-off belt 16 and guide rail portion 122, 422 is preferably about a whole number of article 20 diameters, and most preferably about three or more article diameters. For gaps, indicated in dashed lines, within single file 34 large enough to accommodate an entire article 20, articles from gap-filling row 104 will be drawn by vacuum pressure 60 (see FIG. 2) toward vacuum take-off belt 16 to fill the gap as indicated by the arrows.

Referring now to FIGS. 5 and 7, in addition to being aligned substantially perpendicular to take-off belt 16, guide rail portion 128, 428 is also aligned at a relatively large converging angle with conveyor path 22. Thus, guide rail portion 128, 428 performs more of a "blocking" than a "funneling" function, and ordinarily will not urge or encourage articles in gap-filling row 104 to attempt to squeeze into openings in single file 34 not large enough to receive an entire article 20. As indicated by dashed article 130 in FIG. 5, articles in gap-filling row 104 attempting to fill too small a gap will simply be bumped back into position as single file 34 slides past. Guide rail portion 128, 428 is preferably attached to guide rail portion 122, 422 most preferably by a rounded corner 132.

Single file guide rail portion 80 (also see FIG. 2), located downstream of guide rail portion 128, 428 functions simply to hold articles 20 in single file 34 against take-off belt 16. Single file guide rail portion 80 extends across conveyor surface 24, toward edge 32 and an end 136 of conveyor surface 24, substantially parallel to single file path 46. Single file guide rail portion 80 is preferably connected to guide rail portion 128, most preferably by rounded corner 134.

Operation of conveyor systems 10, 310 may be controlled by sensors 140, 142 and 144. Sensor 140 is a high level alarm which may be used to halt upstream flow of articles to minimize excessive back pressure. Sensor 142 is a low level alarm which may be used to halt operation of conveyor system 10 when the relatively small number of articles on conveyor surface 12 may cause jams. Sensor 144 is a jam detector which may also be used to halt operation of conveyor systems 10, 310 when single file 34 is not moving along flange guide conveyor 18. Sensors 140, 142 and 144 may be provided as photo eyes or the like.

Returning to FIG. 4, contoured guide rail 14 of conveyor system 10 includes additional portions not common with guide rail 314 of conveyor system 310. Guide rail 14 includes another portion 112, similar to guide rail portion 122 and located downstream of guide rail portion 42, which functions to aid in relieving back pressure. Guide rail portion 112 extends across conveyor surface 24 toward edge 32, and is preferably aligned substantially parallel with single file path 46. The alignment of guide rail portion 112 back toward edge 32 creates another region 114 of relatively lower back pressure preventing articles 20 in the region from being forcibly pressed together and thus permitting them to move more freely. Guide rail portion 112 is most preferably connected to guide rail portion 42, most preferably by a rounded corner 126.

Contoured guide rail 14 also includes a portion 118, located downstream of guide rail portion 42, which functions to facilitate filling voids, indicated in dashed lines, within accumulation 44. Guide rail portion 118 is most preferably connected to guide rail portion 112, and most preferably by a rounded corner 120. Guide rail portion 118 extends across conveyor surface 24 toward edge 30 or take-off belt 16 at an angle converging with the conveyor path of between about 20 and 40 degrees, and most preferably at a converging angle of about 30°. Further, guide rail portion 118 is preferably aligned at a converging angle of about 60° to single file path 46 and take-off belt 16. The alignment of guide rail portion 118 not only provides a substantially packed pattern of articles in region 114, but also provides a funneling type function for urging articles to fill voids within accumulation 44 as indicated by the arrows. "Nested" patterns are well known in the art for arranging round articles as densely as possible on pallets and the like.

Referring briefly to FIG. 5, the funneling function of guide rail portion 118 is fulfilled in part by both the "nested" pattern of articles in region 114, as well as the relatively small converging angle with the conveyor path, which most preferably is matched by take-off belt 16. Larger converging angles with the conveyor path, such as that provided for guide rail portion 42, provide more of a blocking function substantially preventing articles from moving downstream as much as they move across conveyor 12. The smaller converging angle of guide rail portion 118, however, permits substantially more downstream than across conveyor movement of articles 20. Finally, the reduced back pressure in region 114 prevents forced funneling or forced void filling which might lead to jams. Instead, articles 20 are merely urged or encouraged to fill voids, and while articles may be squeezed into position to fill voids, only a limited amount of back pressure is available for this purpose so as to limit both potential damage to articles 20 as well as possible article jams. The arrow connects initial and final positions of a squeezed article.

Returning to FIG. 7, contoured guide rail 314 of conveyor system 310 includes an additional portion not common with guide rail 14 of conveyor system 10. Guide rail 314 includes another portion 502 for spacing guide rail portions 342 and 422 apart along conveying direction 22. In this regard, portion 502 spaces converging portion 342 of guide rail 314 as far upstream as necessary to provide a relatively continuous accumulation of articles 20 at take-off area 102. Preferably, guide rail portion 502 is located upstream of end 51 of guide rail 26 such that articles 20 are directed substantially across conveyor 24 toward guide rail 26.

Referring now to FIGS. 6, 7 and 8, conveyor system 310 is preferably also provided with a roller assembly 504 mounted between single file guide 80 and guide rail portion 428. Roller assembly 504 aids articles 20 in gap-filling row 104 to fill gaps in single file row 34 (see FIG. 7). Roller assembly 504 comprises a motor 506, an axled roller 508 mounted in a frame 510 with bearings 512, and a belt and sprocket 514 or other linkage between motor 506 and roller 508. Preferably, roller 508 includes a rubber or like covering 516 for gripping sides of articles 20 to rotate them, and to aid in filling gaps in single file 34.

Referring now to FIGS. 6, 7, 9A and 9B, conveyor system 310 is preferably also provided with an oscillator assembly 520 mounted to guide rail portion 422. Oscillator assembly 520 includes a plurality of vertical ribs 522 which are moved back and forth as indicated by arrow 524 along an inner surface 526 of guide rail portion 422. Vertical ribs 522 are oscillated by a rod and cylinder 528 or like means connected to the ribs by an arm 530. Vertical ribs 522 function to jostle articles 20 in gap-filling rows 104 to aid in preventing them from bridging or jamming between guide rail portion 422 and vacuum belt 16. Oscillator assembly 520 can be continuously operated, but is preferably only operated when sensors 142 and 144 detect a bridge or jam. In this regard, a jam is indicated when there are articles at take-off area 102 but no articles on the flange guide conveyor 18.

As depicted in FIGS. 3 to 5 and 7, the various angles and alignments of portions of contoured guide rails 14, 314 and vacuum belt 16 are approximately correct. Further, as depicted in these Figures, each portion of contoured guide rails 14, 314 has a length approximately equal to a whole number of article diameters.

Although the invention has been described with reference to particular embodiments, features and the like, these are not intended to exhaust all possible features, and indeed many other modifications and variations will be ascertainable to those of skill in the art.

What is claimed is:

1. A conveyor for providing a single file from a mass of articles, comprising:

a conveyor surface for conveying articles along a conveyor path;

means for engaging articles in the mass and for transporting a single file of them off of said conveyor surface, at least a portion of said engaging means mounted along a single file path at an angle to the conveyor path; and a guide rail mounted along said conveyor surface, said first guide rail comprising a first portion for shifting articles from near a first edge of said conveyor surface toward a second edge of said conveyor surface to create an accumulation of articles for transport by said engaging means, said first portion extending across said conveyor surface at an angle to the conveyor path, a second portion, located downstream from said first portion, for filling gaps in the single file of articles transported off of the conveyor surface by said engaging means, said second portion extending across said conveyor surface at an angle substantially perpendicular to the single file path, a third portion, located between said first and second portions, for relieving some of a back pressure on the articles created by the article accumulation, said third portion extending across the conveyor surface from said first portion toward the first edge, and a fourth portion, located between said first and third portions, for spacing said first portion a distance upstream from said third portion.

2. The conveyor of claim 1 wherein said third portion is aligned substantially parallel with the single file path.

3. The conveyor of claim 2 wherein a distance between said third portion and said engaging means is approximately equal to four article diameters.

4. The conveyor of claim 1 wherein said engaging means comprises a vacuum take-off belt.

5. The conveyor of claim 1 wherein said fourth portion is aligned substantially parallel with the conveyor path.

6. The conveyor of claim 1 comprising means for vertically straightening articles moving in the single file.

7. The conveyor of claim 6 wherein said vertically straightening means comprises a wheel substantially horizontally mounted adjacent said vacuum take-off belt, said wheel having spokes defining pockets matching a cross section of the articles, and said vacuum take-off belt presenting a single file of articles into engagement with successive pockets of said wheel.

8. A conveyor for providing a single file from a mass of articles, comprising:

a conveyor surface for conveying articles along a conveyor path;

means for engaging articles in the mass and for transporting a single file of them off of said conveyor surface, at least a portion of said engaging means mounted along a single file path at an angle to the conveyor path; and a guide rail mounted along said conveyor surface, said first guide rail comprising a first portion for shifting articles from near a first edge of said conveyor surface toward a second edge of said conveyor surface to create an accumulation of articles for transport by said engaging means, said first portion extending across said conveyor surface at an angle to the conveyor path, a second portion, located downstream from said first portion, for filling gaps in the single file of articles transported off of the conveyor surface by said engaging means, said second portion extending across said conveyor surface at an angle substantially perpendicular to the single file path, a third portion, located between said first and second portions, for relieving some of a back pressure on the articles created by the article accumulation, said third portion extending across the conveyor surface from said first portion toward the first edge, and means, mounted adjacent said third portion, for jostling articles between said third portion and said article engaging means to aid in preventing jams.

9. The conveyor of claim 8 wherein said guide rail comprises a fourth portion, located between said first and third portions, for spacing said first portion a distance upstream from said third portion.

10. The conveyor of claim 9 wherein said fourth portion is aligned substantially parallel with the conveyor path.

11. The conveyor of claim 8 wherein a distance between said third portion and said engaging means is approximately equal to four article diameters.

12. The conveyor of claim 8 wherein said jostling means comprises oscillating means.

13. The conveyor of claim 12 wherein said jostling means comprises vertical ribs oscillated along said third portion of said guide rail.

14. A conveyor for providing a single file from a mass of articles, comprising:

a conveyor surface for conveying articles along a conveyor path;

means for engaging articles in the mass and for transporting a single file of them off of said conveyor surface, at least a portion of said engaging means mounted along a single file path at an angle to the conveyor path; and a guide rail mounted along said conveyor surface, said first guide rail comprising a first portion for shifting articles from near a first edge of said conveyor surface toward a second edge of said conveyor surface to create an accumulation of articles for transport by said engaging means, said first portion extending across said conveyor surface at an angle to the conveyor path, a second portion, located downstream from said first portion, for filling gaps in the single file of articles transported off of the conveyor surface by said engaging means, said second portion extending across said conveyor surface at an angle substantially perpendicular to the single file path, a third portion, located between said first and second portions, for relieving some of a back pressure on the articles created by the article accumulation, said third portion extending across the conveyor surface from said first portion toward the first edge, and means, mounted adjacent said second portion, for rotating articles and for aiding to fill gaps in the single file.

15. The conveyor of claim 14 wherein said guide rail comprises a fourth portion, located between said first and third portions, for spacing said first portion a distance upstream from said third portion.

16. The conveyor of claim 14 including means, mounted adjacent said third portion, for jostling articles between said third portion and said article engaging means to aid in preventing jams.

17. The conveyor of claim 16 wherein said jostling means comprises vertical ribs and means for oscillating said vertical ribs along said third portion of said guide rail.

18. A conveyor for providing a single file from a mass of articles, comprising:
- a conveyor surface for conveying articles along a conveyor path;
- means for engaging articles in the mass and for transporting a single file of them off of said conveyor surface, at least a portion of said engaging means mounted along a single file path at an angle to the conveyor path; and
- a guide rail mounted along said conveyor surface, said first guide rail comprising
    - a first portion for shifting articles from near a first edge of said conveyor surface toward a second edge of said conveyor surface to create an accumulation of articles for transport by said engaging means, said first portion extending across said conveyor surface at an angle to the conveyor path,
    - a second portion, located downstream from said first portion, for filling gaps in the single file of articles transported off of the conveyor surface by said engaging means, said second portion extending across said conveyor surface at an angle substantially perpendicular to the single file path,
    - a third portion, located between said first and second portions, for relieving some of a back pressure on the articles created by the article accumulation, said third portion extending across the conveyor surface from said first portion toward the first edge,
    - a fourth portion, located between said first and third portions, for spacing said first portion a distance upstream from said third portion,
- means, mounted adjacent said third portion, for jostling articles between said third portion and said article engaging means to aid in preventing jams, and
- means, mounted adjacent said second portion, for rotating articles and for aiding to fill gaps in the single file.

19. The conveyor of claim 18 wherein said third portion is aligned substantially parallel with the single file path.

20. The conveyor of claim 2 wherein a distance between said third portion and said engaging means is approximately equal to four article diameters.

21. The conveyor of claim 18 wherein said fourth portion is aligned substantially parallel with the conveyor path.

22. The conveyor of claim 18 wherein said jostling means comprises oscillating means.

23. The conveyor of claim 22 wherein said jostling means comprises vertical ribs oscillated along said third portion of said guide rail.

* * * * *